No. 887,574. PATENTED MAY 12, 1908.
J. T. BARR.
NUT LOCK.
APPLICATION FILED FEB. 13, 1908.
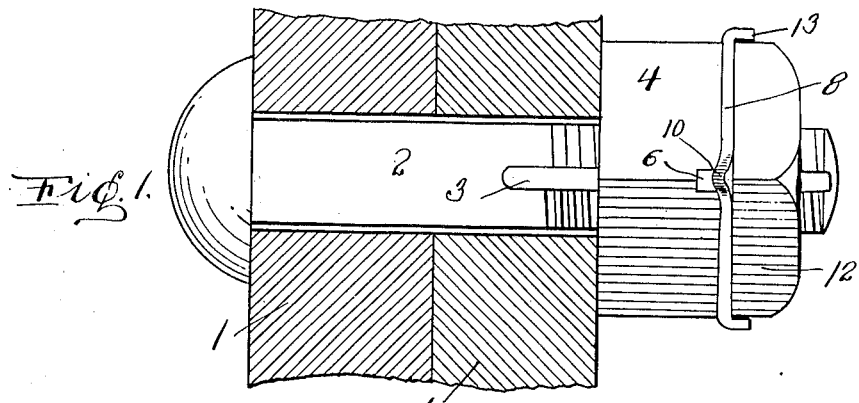
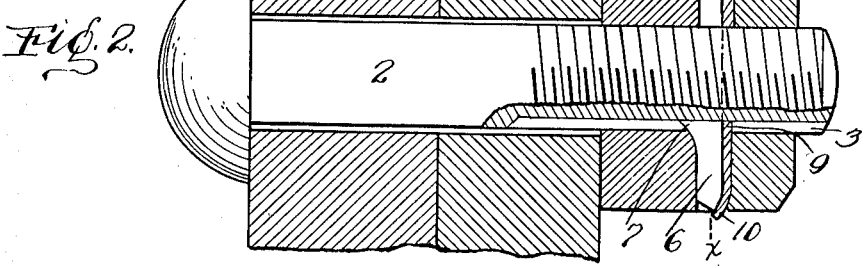
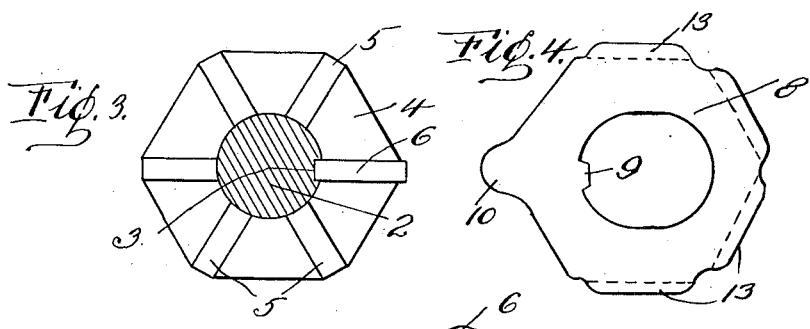
Inventor
J. T. Barr.
Witnesses
J. B. Lawrence.
By
Attorneys

UNITED STATES PATENT OFFICE.

JAMES T. BARR, OF APOLLO, PENNSYLVANIA.

NUT-LOCK.

No. 887,574.     Specification of Letters Patent.     Patented May 12, 1908.

Application filed February 13, 1908. Serial No. 415,641.

*To all whom it may concern:*

Be it known that I, JAMES T. BARR, a citizen of the United States of America, residing at Apollo, in the county of Armstrong and State of Pennsylvania, have invented certain new and useful Improvements in Nut-Locks, of which the following is a specification, reference being had therein to the accompanying drawing.

This invention relates to nut locks, and the object of my invention is, to provide simple and effective means for retaining a nut upon a bolt.

To this end, I have devised positive and reliable means for preventing a nut from becoming accidentally displaced from a bolt, due to any vibrations to which the bolt may be subjected. In this connection, the nut lock is particularly designed for rail joints and such bodies where it is essential that the nut be at all times retained upon the bolt.

The construction of my nut lock is such that it can be installed without the use of skilled labor, and easily removed, without destroying the bolt or nut.

The detail construction entering into my invention will be presently described and then specifically pointed out in the appended claims.

Referring to the drawing: Figure 1 is a view in elevation of a nut lock embodying my invention, Fig. 2 a longitudinal sectional view of the same, Fig. 3 a cross sectional view taken on the line *x—x* of Fig. 2, Fig. 4 is an elevation of a washer used in connection with the nut lock, and Fig. 5 is a perspective view of a locking pin.

In the accompanying drawings, 1 designates material through which a bolt 2 extends, the threaded end of said bolt being provided with a longitudinally disposed groove 3.

Adapted to screw upon the bolt 2 is a nut 4, the outer face of said nut having a plurality of radially disposed slots 5 formed therein. Adapted to fit in one of said slots is a locking pin 6 having a projection 7 adapted to extend into the groove 3 and into the face of the nut 4, as shown in Fig. 2 of the drawings.

Mounted upon the bolt 2 to lock the locking pin 6 in position is a washer 8, this washer having an inwardly extending tooth 9 adapted to engage in the groove 3 of the bolt 2. The washer 8 is formed with a projecting lug 10 adapted to be bent to engage the end of the locking pin 6. For holding the washer against the face of the nut 4, I employ another nut 12 and this nut is retained upon the bolt 2 by one or more lugs 13 carried by the washer 8 and bent to engage the edges of the nut 12. In providing the washer 8 with an oval opening, a small groove can be cut in the bolt some distance from the end thereof, to receive the tooth 9. The washer could then be placed upon the bolt without the tooth interfering with the threads thereof, and upon the tooth reaching the groove, the washer could be moved to place the tooth therein. It is therefore apparent that it is not necessary that the groove be cut the entire length of the bolt 2.

It will be observed that the malleable washer 8 firmly holds the nut 12 and the locking pin 6 in position, and that it is impossible for the nut 4 to rotate so long as the locking pin rests or engages in the groove 3.

Having now described my invention what I claim as new, is:—

In a nut lock, the combination with a grooved bolt, of a nut, one face of said nut having slots formed therein, a locking pin adapted to rest in one of said slots and engage in the groove of said bolt, a washer fitting upon said nut, an inwardly protruding tooth carried by said washer and adapted to engage in the groove of said bolt, an extending lug carried by said washer for engaging the end of said locking pin, a nut screwed upon said bolt for retaining said washer thereon, and lugs carried by said washer for engaging said nut and preventing a rotation thereof.

In testimony whereof I affix my signature in the presence of two witnesses.

JAMES T. BARR.

Witnesses:
   S. A. GOURLEY,
   EARLE F. COCHRANE.